United States Patent
Saban et al.

(10) Patent No.: US 11,908,052 B2
(45) Date of Patent: Feb. 20, 2024

(54) SYSTEM AND METHOD FOR DIGITAL MAKEUP MIRROR

(71) Applicant: EyesMatch Ltd., Tortola (VG)

(72) Inventors: Ofer Saban, Vienna, VA (US); Nissi Vilcovsky, Tokyo (JP)

(73) Assignee: EYESMATCH LTD., Tortola (VG)

( * ) Notice: Subject to any disclaimer, the term of this patent is extended or adjusted under 35 U.S.C. 154(b) by 132 days.

(21) Appl. No.: 15/759,819

(22) PCT Filed: Jun. 29, 2017

(86) PCT No.: PCT/US2017/040133
§ 371 (c)(1),
(2) Date: Mar. 13, 2018

(87) PCT Pub. No.: WO2018/005884
PCT Pub. Date: Jan. 4, 2018

(65) Prior Publication Data
US 2018/0278879 A1    Sep. 27, 2018

Related U.S. Application Data

(60) Provisional application No. 62/430,311, filed on Dec. 5, 2016, provisional application No. 62/356,475, filed on Jun. 29, 2016.

(30) Foreign Application Priority Data

Apr. 4, 2017   (CA) .................................. CA 2963108

(51) Int. Cl.
*G06T 11/60*     (2006.01)
*G06T 11/00*     (2006.01)
(Continued)

(52) U.S. Cl.
CPC .............. *G06T 11/60* (2013.01); *G06F 18/00* (2023.01); *G06T 7/11* (2017.01); *G06T 7/13* (2017.01);
(Continued)

(58) Field of Classification Search
CPC .......... G06F 3/017; G06F 3/011; G06F 3/005; G06T 19/006; G06T 11/60;
(Continued)

(56) References Cited

U.S. PATENT DOCUMENTS

| | | | |
|---|---|---|---|
| 2009/0051779 A1* | 2/2009 | Rolston | A46B 7/04 348/222.1 |
| 2013/0169827 A1* | 7/2013 | Santos | H04N 5/23229 348/207.1 |
| 2013/0343729 A1* | 12/2013 | Rav-Acha | G11B 27/28 386/285 |

* cited by examiner

Primary Examiner — Farhan Mahmud
(74) Attorney, Agent, or Firm — WOMBLE BOND DICKINSON (US) LLP; Joseph Bach, Esq.

(57) ABSTRACT

A computer implemented method for emulating a mirror using camera video stream and a display screen to generate a digital mirror. The digital mirror is specifically configured for headshot applications, such as makeup and eyeglass tryout sessions. Provisions are made for correcting the appearance of the face on the screen. Specific implementations enable tracking the movement of the face or specific features of the face and applying virtual makeup or virtual glass or other accessories or other filters to the face. Also, recording sessions and auto-editing provides the user with easy accessibility to the tutorial session and the products used during the session. Products may be ordered from the user's mobile device at any time.

29 Claims, 6 Drawing Sheets

(51) Int. Cl.
| | |
|---|---|
| *G06T 7/194* | (2017.01) |
| *H04N 21/422* | (2011.01) |
| *G06V 10/56* | (2022.01) |
| *G06V 40/16* | (2022.01) |
| *G06V 40/18* | (2022.01) |
| *G06F 18/00* | (2023.01) |
| *H04N 23/56* | (2023.01) |
| *H04N 23/63* | (2023.01) |
| *G06V 20/20* | (2022.01) |
| *G06V 20/64* | (2022.01) |
| *G06T 7/11* | (2017.01) |
| *G06T 7/246* | (2017.01) |
| *G06T 7/73* | (2017.01) |
| *G06T 7/13* | (2017.01) |
| *H04N 5/262* | (2006.01) |
| *H04N 5/445* | (2011.01) |
| *H04N 9/74* | (2006.01) |
| *G06Q 30/0282* | (2023.01) |

(52) U.S. Cl.
CPC .............. *G06T 7/194* (2017.01); *G06T 7/246* (2017.01); *G06T 7/73* (2017.01); *G06T 11/00* (2013.01); *G06V 10/56* (2022.01); *G06V 20/20* (2022.01); *G06V 20/64* (2022.01); *G06V 40/162* (2022.01); *G06V 40/166* (2022.01); *G06V 40/167* (2022.01); *G06V 40/171* (2022.01); *G06V 40/193* (2022.01); *H04N 5/2628* (2013.01); *H04N 5/44504* (2013.01); *H04N 9/74* (2013.01); *H04N 21/42204* (2013.01); *H04N 23/56* (2023.01); *H04N 23/63* (2023.01); *G06Q 30/0282* (2013.01); *G06T 2200/24* (2013.01); *G06T 2207/10016* (2013.01); *G06T 2207/30201* (2013.01)

(58) Field of Classification Search
CPC ...... G06T 2207/30201; G02B 27/0172; G02B 2027/014; G02B 2027/0138; G02B 27/0093; G02B 2027/0187; G06Q 30/02; G06K 9/00671; H04N 5/23219
See application file for complete search history.

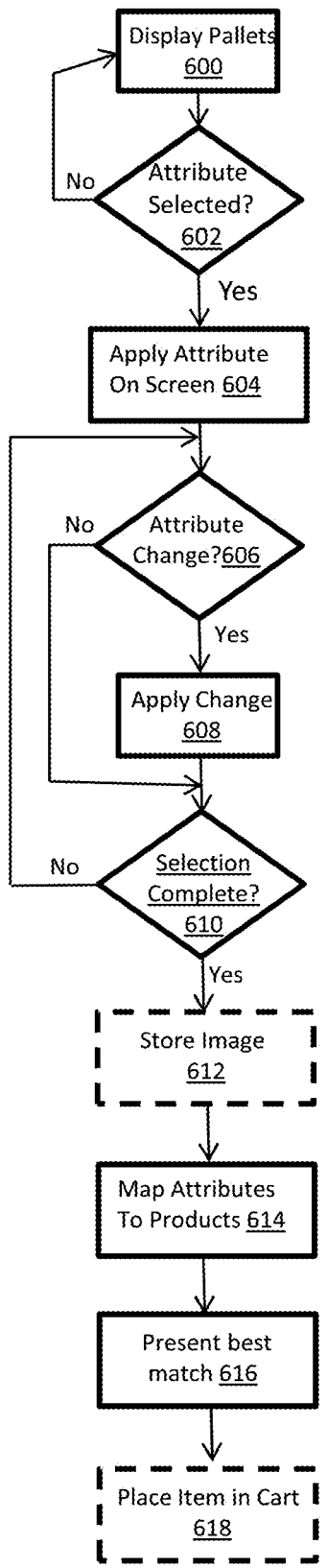
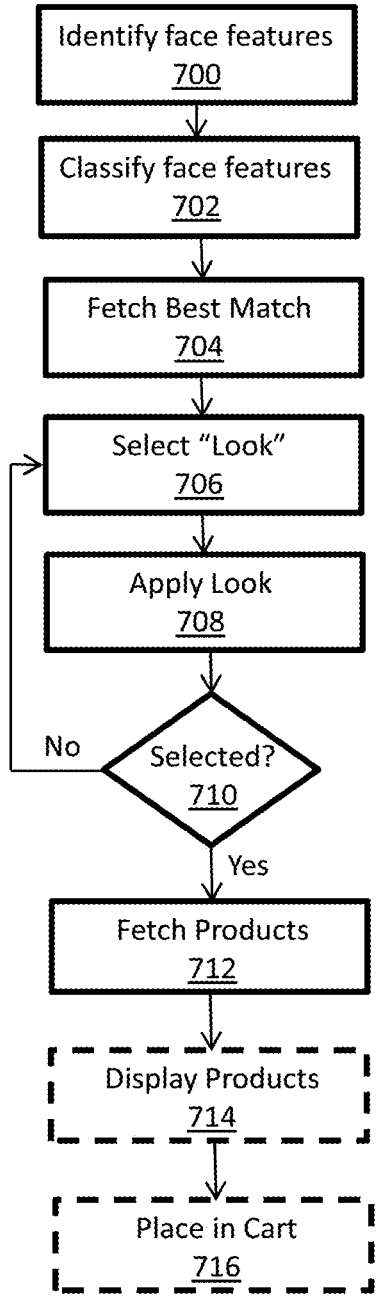
*Figure 6*
*Figure 7*

SYSTEM AND METHOD FOR DIGITAL MAKEUP MIRROR

CROSS-REFERENCE TO RELATED APPLICATIONS

This application is the national phase of International Application No. PCT/US2017/040133, filed on Jun. 29, 2017, which claims the benefit of, and priority to, U.S. Provisional Patent Application No. 62/356,475, filed on Jun. 29, 2016, U.S. Provisional Patent Application No. 62/430,311, filed on Dec. 5, 2016, and Canadian Patent Application No. 2,963,108, filed on Apr. 4, 2017. The entire disclosures of all of the above listed applications are incorporated herein by reference.

BACKGROUND

1. Field

This disclosure relates to digital mirrors and, more specifically, to digital mirrors that are specifically configured for headshots, such as makeup sessions and eye glass trying sessions.

2. Related Art

The conventional mirror (i.e., reflective surface) is the common and most reliable tool for an individual to explore actual self-appearance, in real time. A few alternatives have been proposed around the combination of a camera and a screen to replace the conventional mirror. However, these techniques are not convincing and are not yet accepted as a reliable image of the individual as if he was looking at himself in a conventional mirror. This is mainly because the image generated by a camera is very different from an image generated by a mirror.

Applicants have previously disclosed novel technologies for converting and transforming a still image or 2D or 3D video created by one or more cameras, with or without other sensors, into a mirror or video conference experience. Examples of Applicants' embodiments are described in, e.g., U.S. Pat. Nos. 7,948,481 and 8,982,109. The embodiments disclosed therein can be implemented for any general use of a mirror. Applicant followed with further disclosures relating to adapting the mirror to specific needs, such as, e.g., clothing stores. Examples of Applicants' embodiments are described in, e.g., U.S. Pat. Nos. 8,976,160 and 8,982,110.

In many department and beauty stores, demonstration makeup sessions are provided to customers. The objective is that if the customer likes the result, the customer would purchase some of the items used during the demonstration. However, once the session is over and the customer has left the store, the customer may not remember which products have been used and also how to apply them. Moreover, at times the customer may want to try several different products, e.g., to compare different lipstick colors, but would not like to apply and remove different makeup products successively.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments include a transformation module which transforms the video stream received from the camera and generate a transformed stream which, when projected on the monitor screen, makes the image appear like a mirror's image. As can be experienced with devices having cameras mounted above the screen (e.g., video conference on a laptop), the image generated is not personal, as the user seems to be looking away from the camera. This is indeed the case, because the user is looking directly at the screen, but the camera is positioned above the screen. Therefore, the transformation module transforms each frame (i.e., each image) such that it appears as if it was taken by a camera positioned behind the screen—that is, the image appears as if the user is looking directly at a camera positioned behind the screen, even though the image is taken by a camera positioned above or besides the screen. The translation module adjusts the presentation of the image onto the screen, so that the face appears centered on the screen, regardless of the height of the user. An eyesmatch unit transforms the image of the eyes of the user, such that it appears that the eyes are centered and looking directly at the screen—just as when looking at a mirror. Also, an augmented reality module enables the application of virtual makeup on the user's image projected on the monitor screen.

According to disclosed embodiments, a system is provided for capturing, storing and reorganizing a makeup session—whether real or virtual. A demonstration makeup session is done using any embodiment of the digital mirrors described herein. The demonstration makeup session is recorded at any desired length (e.g., usually it is 5-20 min). This recorded session is stored in a storage device, e.g., local server or cloud computing server. In some embodiments, the stored session is shared with the customer, e.g., by providing the customer with a link, so the customer will be able to review how the make artist applied the makeup.

According to one embodiment, the stored video is then edited by breaking it into sub-sessions. The sub-sessions may include, for example: Foundations, Powder, Bronzer, Concealer, Lipstick, Lip gloss, Mascara, Eye shadow, Lush, Brows, and Eyeliner. The start of each of these sub-sessions is marked in the stored session video, e.g., with metadata, and icons are generated, each icon having a link to a corresponding mark. This will allow to mark each sub-session and for the user to jump or skip to particular sessions of interest. By "slicing" the video according to the sub-sessions the customer will be able to browse specific sub-sessions rapidly and browse the history by sub-session. Reviewing the sessions and sub-sessions may be done with thumbnails, icons, etc.

Aspects of the invention include a digital make-up mirror, comprising: a digital screen; a digital camera positioned to generate video stream of a face of a user; a controller coupled to the digital screen and to the digital camera and preprogrammed to perform the operations comprising: receiving the video stream from the camera; identifying facial features within the video stream; flipping each frame over a vertical axis to replace right side with left side of the image to thereby mimic a mirror image; transforming each frame to emulate an image of the user looking directly at the screen as if there was a camera positioned directly behind the screen; cropping each frame to enable display of the face of the user at the center of the digital screen; and, displaying the video stream on the digital screen after the flipping, transforming and cropping operations. The controller may further performs the operation comprising identifying facial features within each frame of the video stream so as to track location of each of the facial features within each frame. The facial features include lips, eyes, and eyebrow, chin and nose. Identifying facial features may comprise identifying outlines of the facial features. Identifying facial features may comprise identifying pixels belonging to each facial feature.

The controller may further perform the operation comprising: displaying on the digital screen a color pallet corresponding to a makeup category; enabling the user to designate a selection from the color pallet; and digitally applying the selection to one of the facial features corresponding to the makeup category. Digitally applying the selection may comprise changing attributes of pixels belonging to the facial feature. Displaying the color pallet may comprise displaying a plurality of colors and a plurality of color attributes. The color attributes may include at least transparency and glossiness.

The controller may further perform the operation comprising enabling the user to modify the attributes after digitally applying the selection. Digitally applying the selection may further comprise tracking location of each of the facial features within each frame and applying changing digital application of the selection according to movement of the facial feature within each frame. Digitally applying the selection may be performed by using a mask having a shape of a selected facial feature.

The digital make-up mirror may further comprise a look-up table associating the color pallet and products data. The controller may further perform the operation comprising displaying a product corresponding to the designated selection. The controller may further performs the operation comprising: displaying on the digital screen a plurality of preprogrammed makeup looks; enabling the user to designate a selection from the makeup looks; and digitally applying the selection to user's face projected onto the digital screen. The controller may further perform the operation comprising displaying on the screen images of the products used in generating the makeup look.

The digital make-up mirror may further comprise an illumination device comprising a plurality of light sources of a plurality of temperatures. The controller may further perform the operation comprising changing lighting intensity of the plurality of light sources to generate a desired overall light temperature. The controller may further perform the operation comprising: projecting on the digital screen lighting temperature selection; enabling the user to designate a selection from the lighting temperature selection; and changing lighting intensity of the plurality of light sources according to the user designation.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 6 illustrates a general process flow executed by the digital makeup mirror to simulate a makeup session according to one embodiment.

FIG. 7 illustrates a flow chart for performing a virtual makeup session according to one embodiment.

DETAILED DESCRIPTION

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Embodiments of the invention involve both hardware and software designs that are particularly tailored for use as a close-proximity mirror, i.e., situation wherein the user observes its own face, such as for applying makeup, hair styling, or glasses fitment. Such situations require different considerations when virtualizing a mirror. Part of the difficulties comes from the fact that the monitor screen must be placed relatively close to the user's face, such that the camera is also very close—thereby generating distortions. That is, while the user will be looking directly at the screen, the camera obtains an image from above the screen, such that it appears that the user does not look directly at the camera. This is an unnatural point of view for the user, who is used to look at a mirror where the eyes appear to look directly at the mirror. Additionally, there are also proximity distortions wherein parts of the body closer to the camera appear larger than those farther away. Finally, the placement of the user's face with respect to the screen's frame would differ depending on the user's height.

Illumination considerations are also critical when emulating a mirror that is close to the user's face. This is especially important when the digital mirror is used to inspect makeup, wherein the color appearance the makeup should be as close as possible to the way the makeup looks in daylight.

Figure 1:
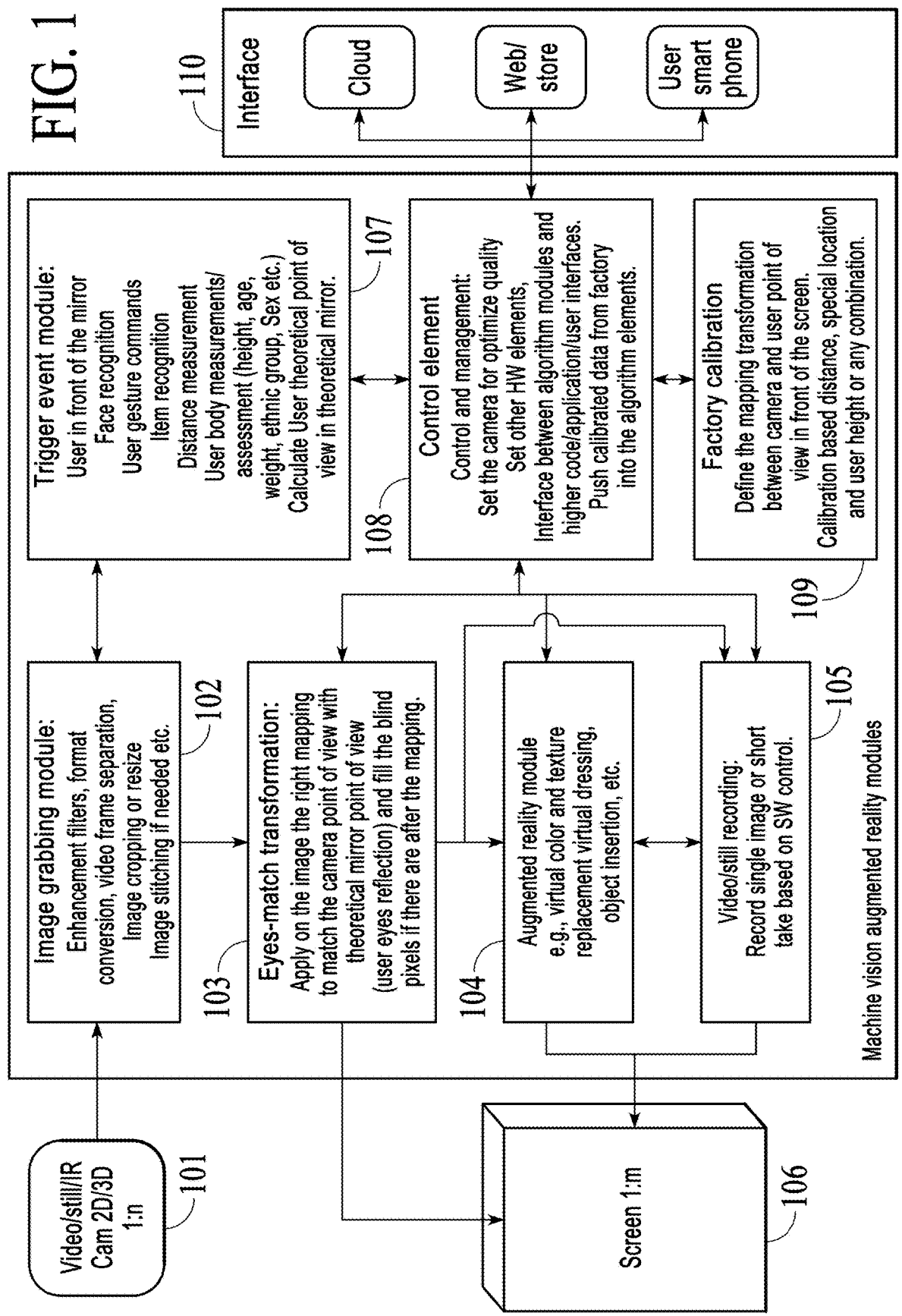
FIG. 1 is a system block diagram for an augmented reality platform supporting a real-time or recorded video/image according to one embodiment.

FIG. 1 is a system block diagram for an augmented reality platform supporting a real-time or recorded video/image. The system can include one or a plurality (1:n) of input devices 101 including a video camera, a still camera, an IR camera, a 2D camera or a 3D camera. The input device 101 can be adapted to send information to one or more machine vision augmented reality modules 102, 103, 104, 105, 107, 108 and 109. The one or more machine vision augmented reality modules 102, 103, 104, 105, 107, 108 and 109 can be adapted to send information to one or a plurality (1:m) of display screens 106. The one or more machine vision augmented reality modules 102, 103, 104, 105, 107, 108 and 109 can be adapted to send/receive information to/from an interface or user interface module 110. The interface 110 can be adapted to send/receive information to/from one or more of a cloud, a web/store or a user device, e.g., smart phone or tablet. Note also that in some embodiments the user interface is implemented in the form of a touch screen of the display screen 106.

The one or more machine vision augmented reality modules 102, 103, 104, 105, 107, 108 and 109 can include an image grabbing module 102, a eyes-match transformation module 103, an augmented reality module 104, a video/still recording module 105, a trigger event module 107, a control element module 108, and a factory calibration module 109.

The image grabbing module 102 can include one or more of the following features: enhancement filters, format conversion, video frame separation, image cropping, image resizing, image stitching and the like. The image grabbing module 102 can be adapted to send information to the eyes-match transformation module 103. The image grabbing module 102 can be adapted to send and/or receive information to/from the trigger event module 107.

The eyes-match transformation module 103 can be adapted to apply on the image the right mapping to match the camera point of view with theoretical mirror point of view (user eyes reflection) and fill the blind pixels if there are any after the mapping. The eyes-match transformation module 103 also performs image translation to place the image of the face centrally in the frame of the display screen, regardless of the height or position of the user. Thus, the eyes-match transformation module 103 may perform two distinct functions: image transformation to modify the digital image captured by the input device 101 so as to mimic a mirror image on the display screen, and image translation to center the image within the frame of the display screen.

The image transformation may include centering the pupils within the user's eyes, to appear as if the camera was placed directly behind the screen during the image capture. That is, for this process, the eyes-match transformation module 103 determines all the pixels that belong to the sclera of each eye, and determines all of the pixels that belong to the iris of each eye. The eyes-match transformation module 103 then calculate the center of each sclera and translates the pixels belonging to the iris so that the pupil within the iris is centered with respect to the center of the sclera. The "missing" pixels remaining after the translation of the iris are filled with the same color and appearance as the pixels belonging to the sclera.

The eyes-match transformation module 103 can be adapted to send information to the augmented reality module 104 and/or the video/still recording module 105. Also, the eyes-match transformation module 103 can be adapted to send/receive information to/from the control element module 108. Further, the eyes-match transformation module 103 can be adapted to send information to the one or plurality of screens 106.

The augmented reality module 104 can be adapted, for example, to provide virtual color and texture replacement, virtual dressing, object insertion and the like. In the specific embodiments disclosed herein the augmented reality module 104 is configured to alter the color and intensity of selected pixels so as to provide virtualized makeup. In other embodiments, the augmented reality module 104 is configured to superimpose an image over the user's face, e.g., to virtualize glasses over the face of the user.

The augmented reality module 104 can be adapted to send/receive information to/from the control element module 108 and/or the video/still recording module 105. Also, the augmented reality module 104 can be adapted to send information to the one or plurality of screens 106.

The video and/or still recording module 105 can be adapted to record a single image or a short take based on software control. The video/still recording module 105 can be adapted to send/receive information to/from the control element module 108. Also, the video/still recording module 105 can be adapted to send information to one or plurality of screens 106.

The trigger event module 107 is optional and can include one or more of the following features: recognition of a user in front of the mirror, face recognition, recognition of user gesture commands, item recognition, distance measurement, user body measurements/assessments (including, e.g., height, age, weight, ethnic group, sex and the like) and calculation of user theoretical point of view in theoretical mirror. In the embodiments relating to makeup sessions, the trigger event module can be configured to identify the user's skin color and complexion, and that information can be used to adjust the illumination. The trigger event module 107 can be adapted to send/receive information to/from the control element module 108.

The control element module 108 can include one or more of the following features: control and management for setting the camera to optimize quality, control and management for setting the illumination color (temperature) and intensity, for setting other hardware elements, an interface between algorithm modules and higher code/application/user interfaces, and push calibrated data from factory into the algorithm elements. The control element module can be adapted to send/receive information to/from the factory calibration module 109.

The factory calibration module 109 can be adapted to define the mapping transformation between the camera and the user point of view in front of the screen. Also, factory calibration module 109 can be adapted to calibrate the image based on distance, a special location, user height (translation), other measurement of geometry of the seen or any combination thereof.

FIG. 1 and the following description represents just examples of one embodiment of the present invention; other flows or functionalities can be allocated between the modules, represent additional embodiments that are part of the invention. The present inventors propose two methods to enable the augmented reality capabilities (real-time and offline). Both methods wrap the augmented reality module 104 with real image or video data that is real-time or was taken post processing via, e.g., eyes-match transformation module 103.

One feature is that a user can define manually or automatically (via, e.g., interface 110) relates to what items the user would like to process and manipulate and what is the expected end result, e.g., an automated rule can be something like a look for a user's lips, which can then be changed to a different color using pre-programmed lipstick colors. Then, the selected object can be processed and extracted/segmented out and recorded to the database linked to the original recorded video or image. The augmented reality module 104 can then process the model/mask in real-time at a given frame rate, which can be at a lower or higher frame rate than the original and at the same or a different size than the original. For example, once extracted the appearance of the lips can be modified by proper coloration—creating the impression of a desired shaped lips. In one example, different shapes of lips are stored beforehand, and the user may select a combination of lips shape and lipstick color and the augmented reality module 104 would render it on the user's image in real time, enabling the user to see how such makeup would look and experimenting with different shaping techniques and different colors and outlines.

Examples of disclosed applications can include live augmented reality, enabling trying-on different makeup and/or glasses when the user would like to see him/herself with the modification (one or more options). Once the extracted object from the live scene is saved, it is easier to render multiple changes (color, texture, size, and the like) by operating on the pixels that were identified as belonging to the extracted object. In addition, it is easier to perform a longer process, much more accurately, with higher quality and utilizing a process that yields more information, e.g., user movement, body measurements, and quality based on frame integration and the like. For video input, it is highly recommended that the rendering process be done in a DSP or GPU device in order to avoid introduction of delay into the video.

In the trigger event module 107, some of the trigger functionality can be completely automated, e.g., a process can be started if face detection or presence detection is made. The process may be transformation and translation of the video stream. Some of the triggers can be performed in a semi-automated fashion from the user interface module 110, which can include any way to control the computerized device. Some of the functionality of the trigger event is to calculate the image transformation based on geometric information, calibration, and/or real-time user tracking, e.g., location of the user, eyes, head, hands, position, movement and the like. The tracking can be done using one or more techniques such as background substation, pattern recognition, color segmentation, body part or other classifiers, and the like that are based on image processing. The transformation tracking calculation functionality can also be implemented in the other modules. The tracking can be a feed to the transformation from other modules, like a different tracking technology that are not image recognition based e.g., thermal heat, lasers, TOF, inertial sensors, orientation sensors, mobile device with GPS location and orientation, etc.

The control element module 108 can be adapted to configure the system setup, camera device authentication and the like. The control element module 108 can also provide information from the tracking transformation function into actual geometry transformation module or augmented reality module and the like.

With the factory calibration module 109, some of the information needed to calculate the transformation to be applied on the image/video can be generated during factory calibration or can be calculated based on additional information on the actual orientation of the camera in the field, e.g., height above the floor or desk and the like, 3D point of view, lens field of view (FOV), and the like. The factory information plus the actual geometry of the implementation can be processed and delivered to the right element in the system that will use the information for better calibration and accuracy.

Figure 2:
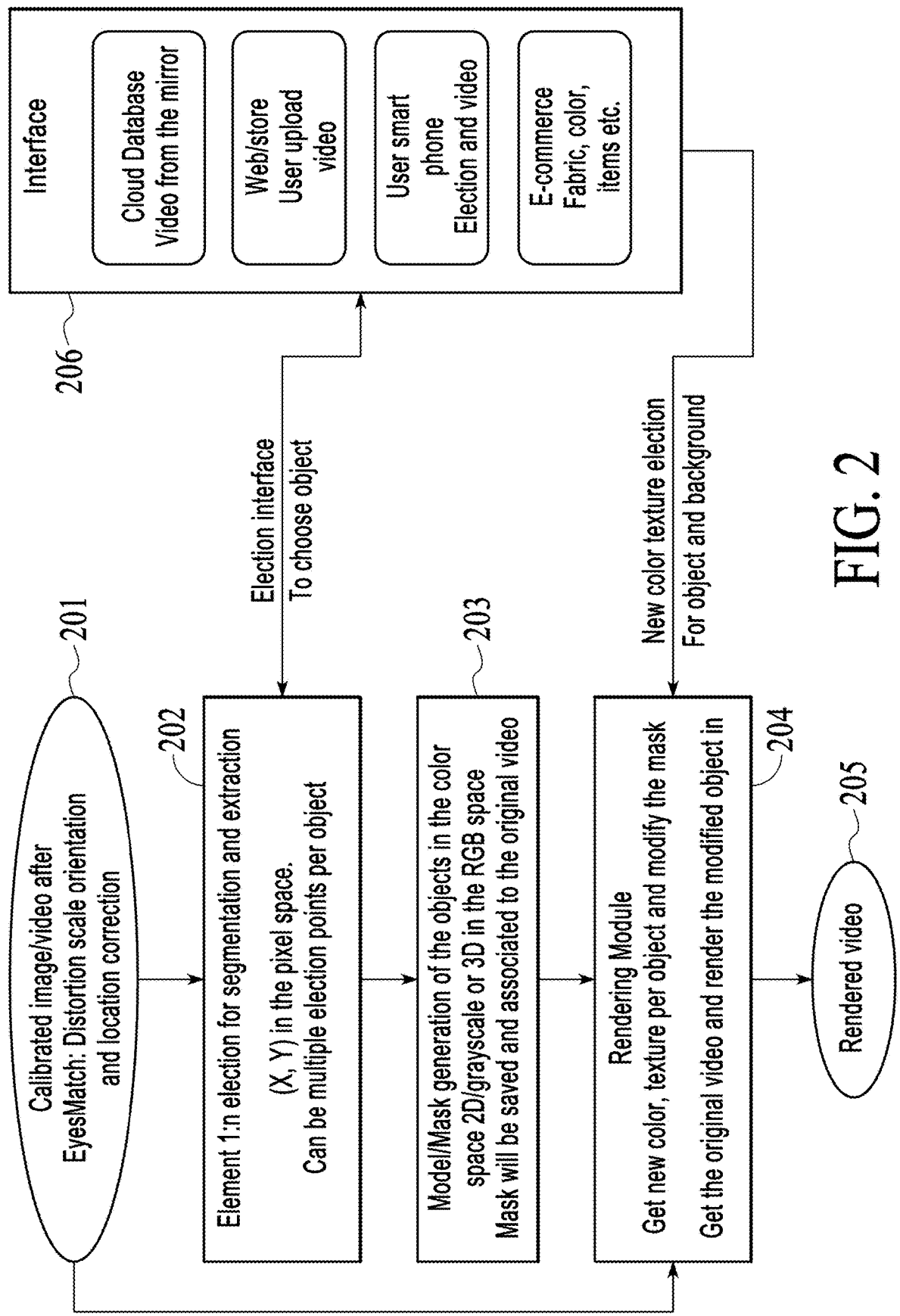
FIG. 2 depicts an embodiment of an augmented reality module, which can correspond with the augmented reality module of FIG. 1.

FIG. 2 depicts an example of an augmented reality module, which can correspond with the augmented reality module 104 described above. Specifically, the augmented reality module can have a function of allowing a user to virtually apply makeup or try on eyeglasses, hats, jewelry, etc. In this embodiment, the system obtains input image or video from, for example, the EyesMatch computerized method 201, which operates a camera positioned above the display screen. In generalized form, the input image or video can be from any image or video source, e.g., user smartphone, security camera, Google glass, mobile camera, head mount display or stationary camera. Additional embodiments can include additional geometric information that will help to calculate proportion like user height, gaze and the like. If the user video or image is coming from the EyesMatch module (calibrated image/video), a more comprehensive model can be created that allows for body measurements, object pose, size, highly accurate orientation detection and the like. The additional information that can be calculated from the calibrated object or video can allow for object fitting, object replacement and insertion of new objects (virtualized eyeglasses, jewelry, etc.) into the frame/video.

The election module 202 can obtain election information from interface 206 manually from the user (X,Y or name of object) or automatically from an electing method, e.g., a mechanism that can automatically detect predefined facial features like lips, cheeks, eyes, nose and the like.

The module 203 can obtain the location and samples the color (or the average color of the feature, which can be more than one color). The module 203 can use this information to create a black and white mask that is first used to generate a 2D or 3D textured shaded and colored mask. This information can then be used to apply virtualization to the facial features, such as applying lipstick to the lips or blush to the cheeks.

The technique to extract the module is based on 3D color correlation or any other technique such as the closest Euclidian distance between the object average color and the pixel color to separate the pixels of the object from the entire image. By this process, the pixels belonging to the feature are identified and can be tagged as belonging to the facial feature. Virtualization can then be applied by changing the color or intensity of the pixels belonging to the facial feature, and the shape may be modified virtually by adding and/or deleting pixels belonging to the facial feature. For example, applying lipstick may be done to a subset of the pixels belonging to the lips and, optionally, to pixel belonging to the face around a particular area of the lips so as to visually modify the vermillion border of the lips, e.g., enhancing the appearance of the cupid's bow.

The decision as to whether the pixel is in the facial feature or not can be performed in multiple levels and is not limited to the following examples:

1. Color correlation and the first decision can be based on Euclidian distance threshold, where the Euclidean distance threshold is in the RGB color space or chromatic color space.
2. Filter noise by applying morphological operators like dilution and erosion, which can improve the decision regarding pixels that are "wrongly labeled" as part or are not part of the facial feature.
3. Decision based on information from previous or forward frames, or from neighboring pixels in a row or around the pixel. This step represents a major decision in the process.
4. Object distance from original election, which can be used as a threshold.
5. Object surface continuation, whereby, if we know that a facial feature continues, or by knowledge gained from reference to a generic shape, then we can filter out some of the noise. For example, by fitting a selected shape of lips and fitting to the image to filter out noise.
6. Object edges, whereby we can improve the decision around edges by edge detection that can be done by high pass (HP) filters or other techniques. This can be especially combined with the object surface continuation for improving the fit.
7. Decision based on color energy. One of the problems of color separation is that color under low light conditions can be seen as black, and the dynamic range of the decision is reduced significantly. Dark/black pixels can be isolated and other techniques can be applied to decide if the dark/black pixels belong to the facial feature or not, e.g., the present invention can determine if the pixel is located inside the feature's boundary, or the distance of the energy from the feature's STD color changes.
8. Decision based on classification technique that identifies contour/landmark on the body element, and additional curve algorithm can apply to make boundaries around them that ultimately represent the body element contours. Real-time Classification can be done also in parallel module and or technology like external dedicated chip optimize on classification (1-5 bit), or other AI technology that can help in segmentation of the body element.
9. Use previous information on the expected feature shape to obtain better results.
10. In case the facial feature is a combination of multiple colors or shapes, multiple color correlation and combining can be used. Additionally, any of the multilevel methods specified above can be used to obtain a higher level decision regarding the facial feature.
11. The decision can also be based on a majority or a decision pertaining to a neighboring pixel/image as a weighted factor in the decision. In case we are processing the decision on the image as a vector, it can be easier to look at the neighbors in the same row or same column depending on how the image matrix is reshaped into a vector.
12. Estimation of the item complexion, and color STD can also add significant information for feature segmentation.
13. Any combination of one or more of steps 1-12 above.

Upon separating the facial features, masks can be created to enable virtualization. The mask can be used for rendering as a simple black and white mask. However, in order to create a convincing feeling of a virtualized feature or object, additional information from the feature or object's texture or appearance can be maintained. In order to obtain the additional important information, the mask can be applied on the original frame or video, and the RGB or gray scale texture shade or brightness scale on the object can be obtained. This information is much more accurate and convincing for color changes since it saves the original object's wrinkle texture, shading, light reflection, material signature and the like. The model mask can be constructed in layers for improved manipulation. Examples of a potential layer structure can be as follows:

1. Black and white mask (to segment out the feature or object). The black and white mask can be very important to distinguish between the feature or object and the background or between the object and another element around the object. Multiple techniques can be used to optimize the object mask/boundaries decision.
2. Object edge mask—representing the edge or outline of the feature or object.
3. Red color mask—representing red areas of the feature or object.
4. Green color mask—representing green areas of the feature or object.
5. Blue color mask—representing blue areas of the feature or object.
6. Textures that apply to all color masks—representing texture appearance of the feature or object. For facial feature this mask can designate skin complexion.
7. Shade or brightness mask—representing shaded or bright areas of the feature or object.
8. Material light reflection mask—representing light reflection of the feature or object.
9. Material light absorption mask—representing light absorbing areas of the feature or object.
10. Mask from other sensors like IR, microwave, depth, ultrasound, ultra band and the like.
11. Layers similar to those described above.

Once the mask model has the required information, in order to change color or texture, the rendering module 204 can be used to modify the specific layer/layers and regenerate the object out of the multiple layers resulting in a rendered video 205 that is extremely realistic. Color masks can be operated at different intensity mixtures to render different lipstick colors according to pre-selected pallet of available lipstick colors of a certain brand. Since all other masks remain the same, the lips will be rendered with all of the shading, brightness, reflection, texture, etc., of the lips, but at different color lipstick, thus rendering a very realistic lipstick on the lips. The effect of some layers can be introduced by multiplication or by adding the modified layer to the frame. Subtraction and division can also define relationships between layers. Additional techniques that allow for more complex item manipulation include a registration technique, which can, based on a few points, stretch/transform an object or facial feature to fit within the boundaries of the manipulated object or feature. In one embodiment, the required change can be outside or inside the original facial feature boundaries and a modified mask for the new object boundaries can be created to replace the original mask model.

In one embodiment, the required change can be obtained from a library of facial features. Using a registration technique, the library mask can be applied to fit the on the user's facial feature to render an appearance change created by the makeup. For example, eyebrow shaping can be virtualized on the user's image using various eyebrow shapes library, to illustrate to the user how eyebrow shaping would look on the user prior to actually implementing the eyebrow shaping.

In one embodiment, the mask can be used as pointers for virtual object registration. In one embodiment, the mask can be used to register objects such as, e.g., eyeglasses, jewelry, hat etc. For example, the black/white mask that segments out the facial eye features can be used for fitment of the eyeglasses.

In one embodiment the contour around the body element land marks can be done in linear interpolation between points, or cubical interpolation, or any Generic polynomial interpolation, Chebyshev interpolation, LaGrange multipliers for interpolation, etc., (the interpolation can be done between two neighbors land marks or more depend on the require curve and the stability of the interpolation. Error in interpolation can be calculated with Least Mean Square relative to linear interpolation or any other technique can be used to handle stability issue at higher order interpolation to eliminate oscillation. This contour interpolation can create a segmentation layer to help in segmenting body elements, or to help in registration of a shape model, or registration of avatar model and define parameters for matching shape or avatar to the landmark counter in real time. In one embodiment, election of the single object or multiple (1:n) objects can be obtained that need to be modeled. From the video, a mask is created per frame. If the user is spinning, a 3D or partially 3D frame by frame model can be created. From this frame by frame model, different perspectives can be obtained and used to create a 3D model that includes some or all of the user's movements. Later on, this information can be used to create a more convincing virtual dressing. That is, the present method can utilize the user's own movements in forming the model.

In one embodiment, the rendering can be performed in the GPU, CPU, cloud GPU or cloud CPU. The input elements to be rendered can come from the CPU, from the user database in the cloud, or from an active link with the inventory/any other database/3D printing, ecommerce data base, social data base and the like.

In one embodiment, an accessory or any other item can be added by learning the dynamic movement and the mask model of the relevant object. Also, the background can be augmented so as to change or create a different environment by the same technique. Once all the required objects are labeled, the required objects can be masked and the combined mask can be used to change the background.

In one embodiment, the rendering module can render the object with an enhanced rendering technique of interpolating the object and the frame into higher resolution, can combine the object at high resolution, can smooth the edges, and can decimate the object back to the required resolution with better quality of integration into the frame. Additional techniques include working directly on the edge of the object by averaging with some weighting factor the value of the pixel in order to better blend the object with the background color.

Figure 3:
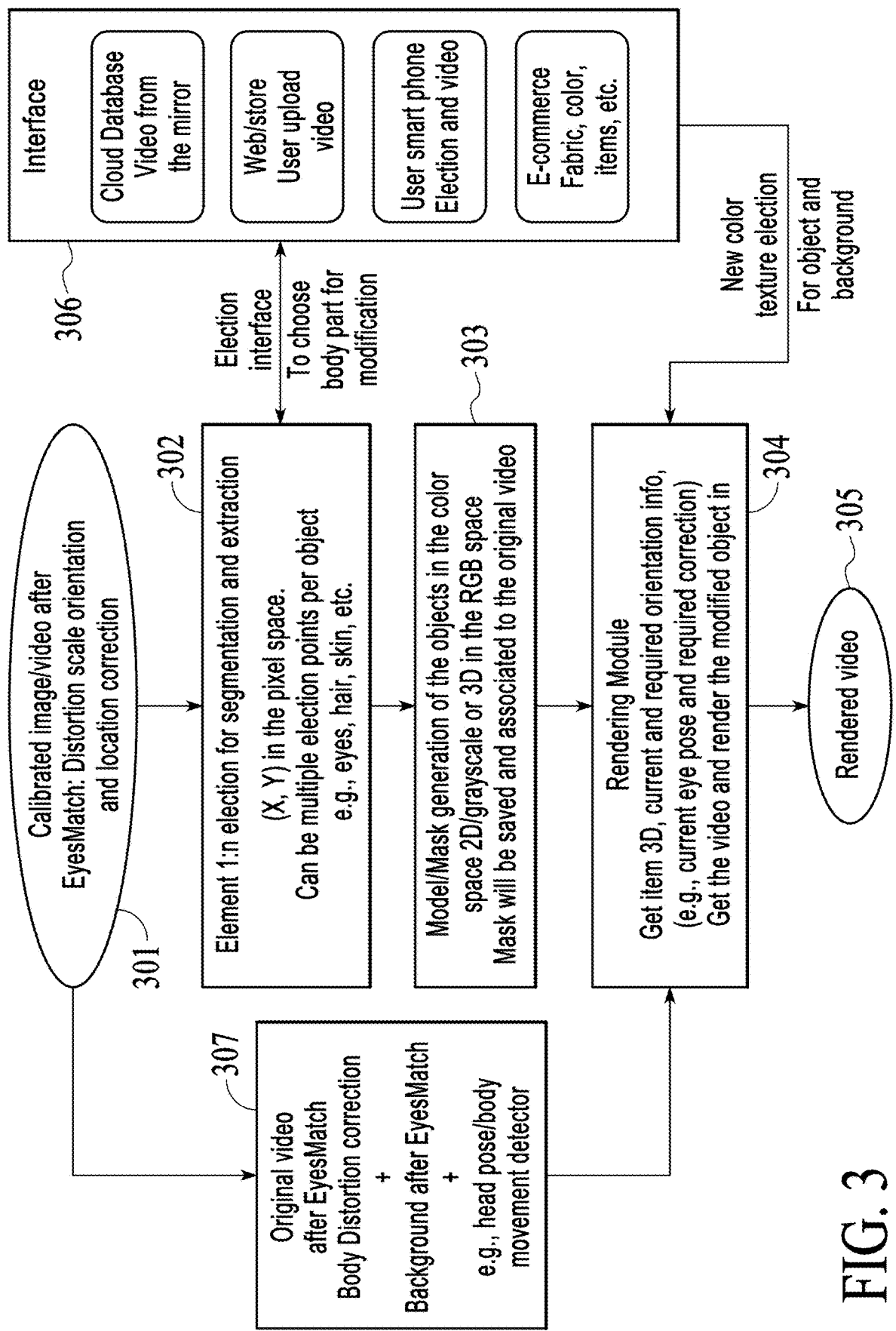
FIG. 3 depicts an embodiment of augmented reality module that can change the appearance of a body part, color, orientation and texture of a facial feature or an item or object in the foreground or background of the image, and may be used in the makeup session disclosed herein.

FIG. 3 depicts an augmented reality module that can change the appearance of a body part, color, orientation and texture of a facial feature or an item or object in the foreground or background of the image, e.g., the module can add hair to the user, change the user's eyes, skin and hair color, can change the pose of the eyes and the like.

Modules 301, 302, 303 and 306 can work in a similar manner as compared to modules 201, 202, 203 and 206 of the previously described general augmented reality module. Module 304 can have the capability of calculating or obtaining additional information like head pose or body direction of movement directly from the EyesMatch module or from module 307 utilizing a dedicated detector for item 3D movement and orientation and can use this information to modify the required body part, e.g., obtaining the head pose will allow for eyes steering correction by modifying the eyes of the mask/model to the required direction. In addition, the head detection can allow for adding hair in the right orientation, a hat and the like.

For example, in a more complex case, one might wish to depict a shorter length of a given hair dress. The mask manipulation in module 304 can be required to create a shorter mask for the new hair dress, and the difference between the original mask and the mask after manipulation can be a new mask for manipulation. In the new mask, some part will be the estimation of the user's exposed body parts once the hair is shortened (e.g., shoulders) and some part will represent background that would be newly visible with the shorter hair length. The new mask can be divided to body and background, and the new rendered object can take the combination of background image and predicted shoulders to create a new rendered image. The result after rendering the modified hair length into the video is a user with shorter hair length prior to actually cutting the hair—which is irreversible, at least for a period of time.

Figure 4:
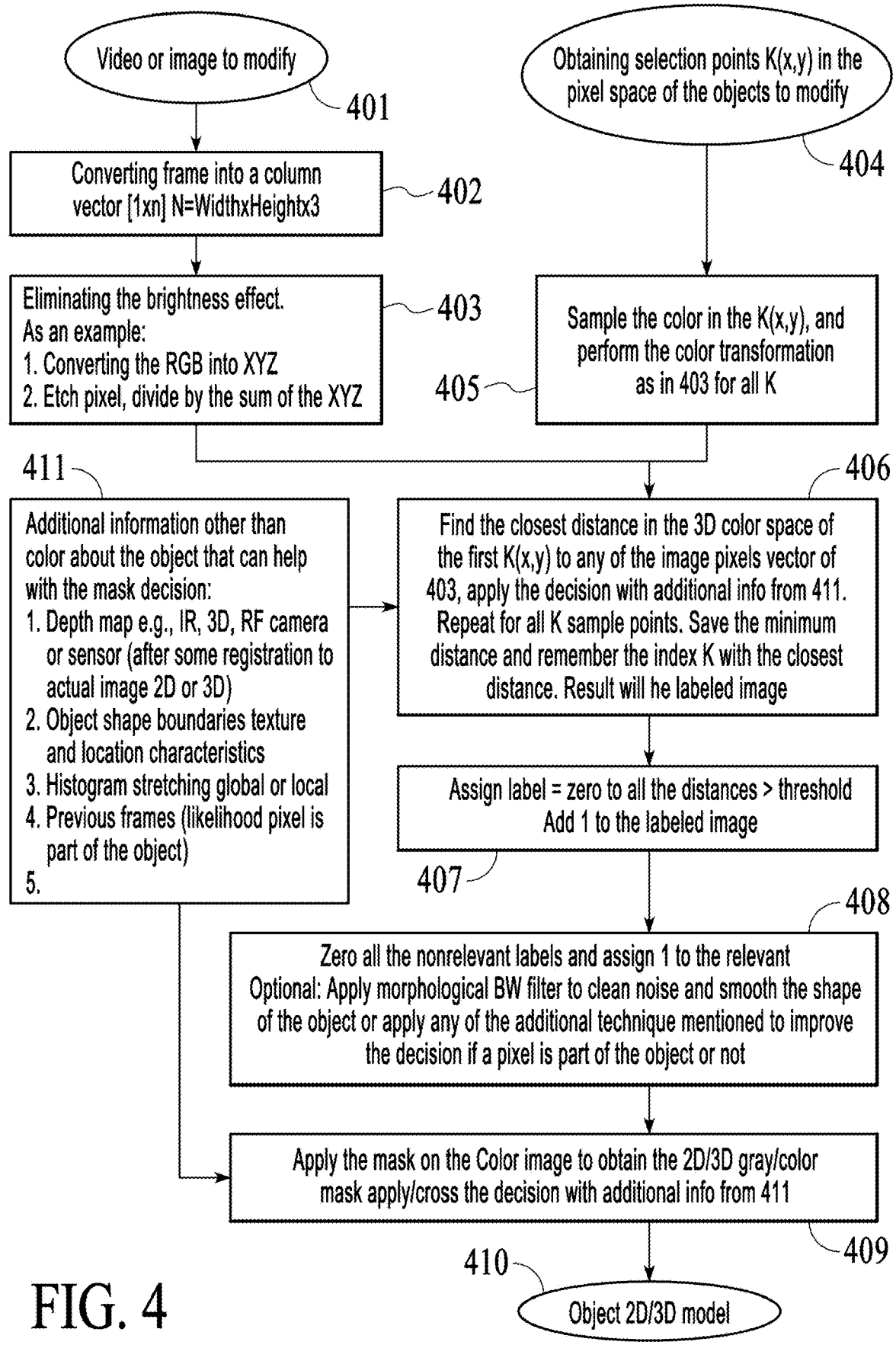
FIG. 4 depicts embodiment of computing methods to create a model for color and texture and/or complexion exchange, which can be referred to as a Colograma.

FIG. 4 depicts computing methods to create a model for color and texture/complexion exchange, which can be referred to as a Colograma. This technique is focused on parallel computing that can support a large number of users or a large number of frames/video as opposed to super high quality color exchange techniques that can be found in software programs such as Photoshop. Such methods can take a lot of time and may not be practical to conduct on any large number of user images or video. The description of FIG. 4 is just an example and any derivative of the depicted flow is part of the present invention.

One challenge to change a color of an object in a video or image is to accurately identify the relevant pixels of the object. In a video file, speed is a limiting factor for applicable transformation. In FIG. 4, a simplified example of a method to segment/extract an object from a video is depicted.

The image or video to be modified is received in 401. In 402, the frame of the color image or video is converted into a line vector, which is optional, though vectorization of the image can speed the process time dramatically. Also, in 403, the effect of the brightness is eliminated. There are many techniques to eliminate the effect of the brightness. In this example, energy averaging per pixel in the XYZ chromatic space is used, by dividing each pixel by the sum of XYZ. For example, a 3×3 matrix can be used to convert RGB to XYZ, using the chromaticity coordinates of an RGB system (xr, yr), (xg, yg) and (xb, yb) and its reference white (XW, YW, ZW). In parallel, at 404 the object selection is performed by selecting all points K(x,y) belonging to the object to be transformed. K is the number of objects/zones with distinguished color that can be segmented out of the background or out of other objects. Then at 405 each point is passed through the same transformation as performed in module 403. At 406, k iterations are performed to find each pixel and to find the closest color. K>/=2 in this technique. For each k, the Euclidian distance 2D or 3D is calculated. The minimum distance and K value is saved. This operation can be done on all pixels at once in a relatively fast process.

$$\text{dist}=\text{sqrt}((X-xi(k))^2+(Y-yi(k))^2+(Z-zi(k))^2)$$

After K iterations, the labeled image can be obtained. The Euclidian distance "dist" is just an example of a computational method to distinguish between colors; there are other methods to calculate the distance between colors, e.g., a color distance model based on human perception of color (chromatic, saturation and brightness), advanced calibrated techniques to match the sensitivity and the ability to separate color with the human eye like in CIE76, CIE94, CIEDE2000 and the like, or any combination with histogram stretching IR/3D depth camera, color integration over time or any other method to improve sensitivity of the color detection (module 411). Applying or crossing the additional information from module 411 can happen at the distance comparison level 406, at the very end of the model creation 409, or any combination depending on the nature of the additional information (deterministic, statistic, time variant, and the like).

In addition to color difference we can also use other techniques that can add information about the object to improve the decision such as: zone likelihood (a given pixel needs to have neighbors or some mass of pixels), zone characteristic, boundary filters to isolate the object boundary before making a final decision, depth information (which typically needs to match the contour of the depth information with the end image of the object in 2D or 3D), time integration to determine if pixel is in the object zone over multiple frames, and the like.

Module 407 is an example of one embodiment of how to distinguish between the required colors and the other color space. In module 407, all the pixels with a distance greater than a threshold are zeroed out as non-relevant (a pixel with a color different from any one of the colors 1 to k), and 1 is assigned to all relevant pixels, thereby generating a binary mask. In 408 a black and white filter can be used to clean noise and smooth out the shape of the object. Other techniques may be used to improve the decision of which pixels belong to the object. As a result, an index for all the relevant colors starts at 2 to K+1.

Module 407 is an example where it is desired to separate a specific color or colors. Here, all the indexes can be zeroed out except the required one. The process proceeds as follows: zero out all the non-relevant indexes, obtain a background and non-relevant colors value=0, and elect the required color object labeled=1. If there is more than one color in the object, 1 can be assigned to any elected index 2 to k+1 and zero to all the others.

At module 409, the obtained black and white mask is applied on the original color image and the 3D model for color and texture changes is obtained. The model can be 2D alpha channel of gray scale or 3D in the color space. Module 410 can obtain a 2D or 3D model of the object. In case of video from a single camera, it is possible to obtain a 3D model even if the user is moving in front of the camera, e.g., turning around in front of the camera. In this case, it is also possible to obtain object measurement in multiple cuts to estimate the user's 3D body or facial curves.

The model based on just color difference is not perfect in terms of quality hence additional information and techniques can be used to improve the quality of the object model (see, module 411). Additional information techniques like interpolation and decimation or edge smoothing can be applied after processing via module 410 in order to improve the quality of the model.

Figure 5:
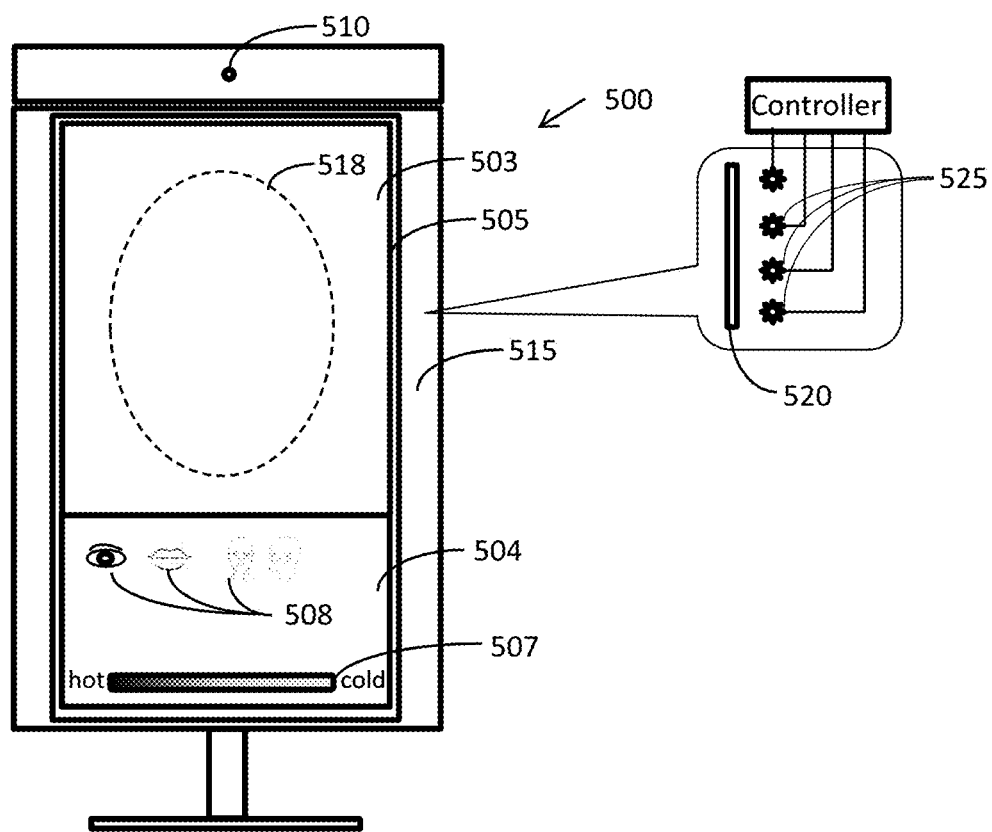
FIG. 5 illustrates an example of the digital mirror according to an embodiment of the invention.

FIG. 5 illustrates an example of the digital mirror according to an embodiment of the invention. This embodiment is configured for close-up imaging, such as for makeup, eyewear, etc. The digital mirror 500 includes a digital display 505, at least one camera 510, and illumination device 515. In this particular example the digital display 505 is divided into two sections: section 503 displays the image from the camera, after appropriate transformation and translation, and section 504 that is used as a user interface using the touchscreen capability of the display screen 505.

As illustrated in the partial cross-section within the callout, the illumination device 515 comprises a light diffuser 520 and a plurality of LEDs 525 of at least two different temperatures. The LEDs 525 are coupled to a controller that controls the intensity of each LED according to the desired light temperature. The adjustment can be defined according to environment condition, skin complexion, etc.

As can be seen in FIG. 5, the camera obtains the image from above the display screen, such that if the image from the camera would be displayed as is, it will be distorted and would not appear as a mirrored image. Moreover, depending on the height of the user, the image of the head would appear at different positions within the digital display 505. Accordingly, the image from the camera is first transformed according to any of the embodiments described above. Additionally, the image is translated so as to position the user's head within an area 518 designated as the center of the screen.

As the image is obtained from the camera, the lighting condition and the skin complexion can be analyzed by the controller, and the controller may then apply different activation signals to the various temperature LEDs 525 so as to provide appropriate illumination on the user's face. Alternatively, illumination temperature controls can be digitally displayed in the user interface 504 to enable to user to control the illumination temperature and/or intensity, as exemplified by slider 507.

According to an embodiment of the invention the digital mirror is used to record a makeup session, e.g., a makeup demonstration session in a store. During the makeup session the demonstrator may use different products and use various techniques to apply the makeup. One purpose of this embodiment is to provide the user with an easy to access recorded and edited video so that the user can practice the application technique and also be able to re-order the products used during the demonstration. In one embodiment the interface section includes pre-programmed buttons 508 indicating various stages of the makeup session, e.g., lipstick, eyelashes, eyebrows, cheekbones, etc. As the demonstrator starts each section the demonstrator clicks on the appropriate button so that an appropriate designation can be on the video stream. Also, the demonstrator may enter the product used by, e.g., selecting from a menu, scanning a bar code, or simply holding the product in front of the camera. The controller may be programmed to recognize the product from the image by, e.g., identifying a bar code, using character recognition to read the label, using image matching to a library of product images, etc.

According to one embodiment, the stored video is then automatically edited by breaking it into sub-sessions. The sub-sessions may include, for example: Foundations, Powder, Bronzer, Concealer, Lipstick, Lip gloss, Mascara, Eye shadow, Lush, Brows, and Eyeliner. This can be done, e.g., by identifying the timing that the demonstrator clicked on the respective button 508. The start of each of these sub-sessions is marked in the stored session video, e.g., with metadata, and icons are generated, each icon having a link to a corresponding mark. This will allow to mark each sub-session and for the user to jump or skip to particular sessions of interest. By "slicing" the video according to the sub-sessions the customer will be able to browse specific sub-sessions rapidly and browse the history by sub-session. Reviewing the sessions and sub-sessions may be done with thumbnails, icons, etc.

According to further features, the make-up artists has the ability to take snap shots or short recordings of the items that the artist used during the session, samples they provided to the customer, and/or the items that customer purchased. These snapshots can be stored in a separate part of the stored video so as to be displayed in a separate part of the screen, e.g., as separated thumbnails. Additionally, the system may use OCR or barcode reader, or QR reader, or classifiers, or image matching or RFID tags, or any tags reader to identify the items and provide textual information regarding the item. Alternatively, or additionally, a user input device enables the make-up artist to add further comments regarding the items. In this manner the user may order the item at a later time.

According to further embodiment, the controller of the mirror is coupled to the cash register and/or accounting system. This can be done via integration of the mirror with existing payment system, e.g., Point of Sale system. In this manner, the controller receives information of what items the customer has actually purchased. In some embodiments the mirror can be activated in a "sales associate" mode. In this mode the sales associate can see what the customer purchased and what samples the customer got. In some embodiments when the mirror is in sales associate mode, the user (i.e., sales associate) is not able to see the videos. Instead, this mode is intended to assist the sales associate to follow up with the customer and in case customer calls with additional questions. Additionally, the name or ID of the sales associate that performed the session or provided the samples can be stored in association with the recorded session and stored product information, such that whenever the customer purchases this item the sales associate can be credited for that purchase.

Other features of these embodiments may include: option to have voice recording during session, which is good for tutorial; the ability to fast forward the recordings; integration with virtual make up, also post processing; integrations with virtual glasses and other accessories; screen at any size includes tablets and phone, the classic memory mirror; video can be stored and edited with and without distortion correction; stream sessions to friends family or forums Facebook rooms etc. Notably, some features are disclosed herein with respect to a particular embodiment. However, it should be appreciated that each feature may be implemented in combination with any disclosed embodiment and any other disclosed feature, depending on the particular application desired. In one embodiment the recording being done with wireless microphone, wired microphone, acoustic focused microphone, etc.

According to further embodiments, a remote virtual make up is enabled, such as remote application of make up through the mirrors. This embodiment is implemented via a mirror to mirror connection. For example sales associate is in a store in Paris, while customer is at home. Both sales associate and customer are using a digital mirror. The sales associate can demonstrate applying make-up remotely to the customer and save the session. In this case, the image captured by the camera of the mirror positioned at the customer location is projected on both the customer's screen and the sales associate screen. The sales associate then uses a user interface to apply make-up to the image projected on the mirror at the sales associate's location. The input from the user interface of the sales associate are used to modify the image projected on both screens, i.e., modify the image on the sales associate's screen and transmitted to the customer's location to modify the image displayed on the customer's mirror. That is, the demonstrator can use virtualized makeup, as will be described further below.

As explained above, when performing make-up, to get good video results it is important to provide good lighting. According to one embodiment, the frame of the mirror includes a plurality of light sources, each providing light at a certain temperature. The lights are controlled by a processor that adjusts the brightness of the light sources so as to provide the appropriate light temperature. In one embodiment, a sensor detects the lighting environment about the face of the person receiving the demonstration. According to another embodiment, a processor analyzes the image from the camera to determine the lighting environment about the face of the person receiving the demonstration. Using the lighting information, and optionally the skin complexion of the person receiving the demonstration, the controller adjusts the light sources to provide lighting at a desired temperature. A feedback loop can be generated by the controller analyzing the image from the camera and adjusting the lighting temperature until a proper image is obtained. In one embodiment the light sources are LED's of different lighting temperatures. For example, LED's of different temperatures can be interlaced, such that their total output can be controlled to obtain the desired lighting temperature.

In general, during a makeup session one has to choose from available products, apply the product, and see whether it looks good. This is a tedious process, even when done virtually. Features disclosed herein enable a different flow for arriving at the desired product. According to this process flow a user chooses attributes of a product, irrespective of an actual product. The user may then manipulate the attributes until the user arrives at the desired attributes. At this point the system uses the desired attributes to map onto a list of available product and select the closest matching product. The closest matching product can then be presented to the user.

In one embodiment the system will show to the user only available colors that the user can purchase, and once the user picks a color the system can translate the selection into a product to place in the cart.

For a better understanding of these features, an example is provided herein using lipstick. Similar process can be used for other makeup products. According to this flow, exemplified in FIG. 6, a makeup artist or a user is provided with pallets for selection. For this example the pallets may include, e.g., color, color intensity or transparency, color effect (e.g., glossiness), etc. The artist or user selects attributes from the pallets to apply virtual lipstick with the selected attributes on the image projected on the digital mirror screen. This can be done either by using virtual brush strokes or by the system recognizing the pixels belonging to the lips and applying the attributes to these pixels to generate image of lips with the lipstick applied. Another option is to have various templates of lip shapes stored in the system. The system identifies the location of the lips in the image and then overlays a selected template with the selected attributes over the image of the lips. Regardless of the method used to virtually color the lips, the system continuously tracks the location of the lips in the image and adjusts the coloration as needed so as to simulate lipstick applied to the lips, even if the user move her head so that the lips location in the image changes.

As the image is presented with the lipstick, the user may vary the attributes and the results are virtualized in real time on the monitor screen. This process continues until it is indicated that the desired attributes have been arrived at. At this point the system "maps" the selected attributes onto a database of products. This can be done, e.g., by creating a look-up table beforehand, wherein the look-up table includes the attributes of available products. When an appropriate match is arrived at, the product name or image can be presented to the user. The user may then place that product in a virtual shopping cart.

The general process flow executed by the digital makeup mirror is shown in FIG. 6. In step 600 the system displays available attribute pallets. In step 602 it is determined whether an attribute was selected. If so, the attribute is applied to the image on the screen. Otherwise the system reverts to detecting selection of attributes. While in this flow chart a single selection of attribute is shown, the selection process can be repeated for any number of attributes, e.g., color, gloss, texture, etc. When the attribute has been selected and applied, in step 606 the system monitors for any change of the attribute, e.g., change of color of the lipstick. In step 608 any detected change is applied to the image on the screen.

In step 610 the system monitors whether selection has been indicated as complete. If so, the system optionally executes step 612, which is to store the image reflecting the final selection of attributes. This step can be skipped, especially when the entire session is recorded as video. Alternate to skipping this step, the system may simply insert metadata for the frames showing the final selection of attributes. This enables the user to jump to these images when viewing the session. In step 614 the system compares or maps the selected attributes to a list of attributes in a products database to identify a product that best matches the selected attributes. In step 616 the system presents on the screen the product that best matches the selected attributes. In step 616 the system may also fetch data related to the product, e.g., price, size, complementary products, etc., and present it to the user on the screen. Optionally, in step 618 the system adds the product to a virtual shopping cart. According to yet another embodiment, the system generates an electronic file that enables the production of a product that matches the exact attributes selected. For example, the system can generate an electronic file that enables the mixing of coloring of a lipstick to produce a lipstick having the exact characteristics selected by the user.

FIG. 7 illustrates another embodiment for performing a virtual makeup session. This method virtually applies a complete "look" on the user's image as projected on the screen. The look includes a complete makeup according to a specific style fetched from a library of styles programmed beforehand. In step 700 the system identifies facial features of the user's image projected on the screen. The features may include, e.g., head shape, skin complexion, lips shape, cheekbones shape and/or height or pronouncement, eyes shape (e.g., deep-set, monolid, upturned, downturned, hooded, protruding, round, close set, wide set, or almond shaped), etc. Using the determined features, at step 702 the system classifies the face features according to preprogrammed list of classifications. Optionally the system may use the facial features classifications to generate a unitary facial classification. In step 704 the system search for match of the classification of the user to pre-stored facial classifications having associated virtual makeup. The system then selects a best match look in step 706. The selection of a look done by the system is performed according to programmed matching of looks and facial classifications. That is, the system is programmed to match the best makeup look for the particular facial classification selected. Alternatively, or additionally, the user may select a look from a list provided by the system. In step 708 the system virtually applied the makeup look onto the image of the user projected on the screen.

In step 710 is the user selects the presented look, the system fetches a list of the makeup products that can be used to produce that look. Optionally the system displays the product at 714 and/or place the product in a virtual shopping cart in 716.

In summary, the various embodiments disclosed above may be summarized as providing a digital make-up mirror, comprising: a digital screen; a digital camera positioned to generate video stream of a face of a user; a controller coupled to the digital screen and to the digital camera and preprogrammed to perform the operations comprising: receiving the video stream from the camera; identifying facial features within the video stream; flipping each frame over a vertical axis to replace right side with left side of the image to thereby mimic a mirror image; transforming each frame to emulate an image of the user looking directly at a camera positioned behind the screen; cropping each frame to enable display of the face of the user at the center of the digital screen; and, displaying the video stream on the digital screen after the flipping, transforming and cropping operations. The controller may further perform the operation comprising identifying facial features within each frame of the video stream so as to track location of each of the facial features within each frame. The facial features include one or more of face, lips, eyes, chin, nose, and eyebrow. Identifying facial features may comprise identifying outlines of facial features and/or identifying pixels belonging to each facial feature.

The controller may further perform the operation comprising: displaying on the digital screen a color pallet corresponding to a makeup category; enabling the user to designate a selection from the color pallet; and digitally applying the selection to one of the facial features corresponding to the makeup category. Digitally applying the selection may comprise changing attributes of pixels belonging to the facial feature. Displaying the color pallet may comprise displaying a plurality of colors and a plurality of color attributes. Color attributes may include at least transparency, splashes of glossiness, and glossiness. The controller may further perform the operation comprising enabling the user to modify the attributes after digitally applying the selection. Digitally applying the selection may further comprise tracking location of each of the facial features within each frame and applying changing digital application of the selection according to movement of the facial feature within each frame. Digitally applying the selection may be performed using a mask having a shape of a selected facial feature.

The digital make-up mirror may further comprise a look-up table associating the color pallet and products data. The controller may further perform the operation comprising displaying a product corresponding to the designated selection.

The controller further performs the operation comprising: displaying on the digital screen a plurality of preprogrammed makeup looks; enabling the user to designate a selection from the makeup looks; and digitally applying the selection to user face projected onto the digital screen. The controller may further perform the operation comprising displaying on the screen images of the products used in generating the makeup look. The digital make-up mirror may further comprise an illumination device comprising a plurality of light sources of a plurality of temperatures. The controller may further perform the operation comprising changing lighting intensity of the plurality of light sources to generate a desired overall light temperature.

The controller may further performs the operation comprising: projecting on the digital screen lighting temperature selection; enabling the user to designate a selection from the lighting temperature selection; and changing lighting intensity of the plurality of light sources according to the user designation.

Further embodiments may be summarized as providing a digital make-up mirror, comprising: a digital screen; a digital camera positioned to generate video stream of a face of a user; a controller coupled to the digital screen and to the digital camera and preprogrammed to perform the operations comprising: receiving video stream from the digital camera; displaying the video stream on the digital screen; segmenting the video stream into makeup sub-sections by inserting segmentation data into the video stream to thereby generate a segmented video stream; and storing the segmented video stream.

The controller may perform the segmenting according to input data entered by a user. The makeup subsections may include at least eyes, cheeks, and lips. The controller may further perform the step of storing a list of products associated with each makeup sub-section.

The controller further performs the steps of: identifying outlines of face features in the video stream; and, tracking location of each identified face feature in each frame.

The controller may apply virtual reality by modifying attributes of pixels belonging to identified face features. The controller applies virtual reality by further constructing a mask corresponding to the identified face features.

The controller may further perform the step comprising: identify outline of a face within the frame; and, translate pixels belonging to the face so that the outline is centered within the digital screen.

As can be understood from the disclosure provided herein, aspects of the invention include a controller coupled to a digital screen and to a digital camera, the controller incorporating a processor and a memory, and preprogrammed to perform the operations comprising: receiving the video stream from the camera; identifying facial features within the video stream; flipping each frame over a vertical axis to replace right side with left side of the image to thereby mimic a mirror image; transforming each frame to emulate an image of the user looking directly at the digital camera as if it was placed behind the screen; cropping each frame to enable display of the face of the user at the center of the digital screen; and, displaying the video stream on the digital screen after the flipping, transforming and cropping operations.

The invention claimed is:

1. A digital make-up mirror, comprising:
   a digital screen;
   a digital camera positioned to generate video stream of a makeup session on a face of a user;
   a user interface including pre-programmed buttons indicating various stages of a makeup session;
   a controller coupled to the digital screen and to the digital camera and preprogrammed to perform the operations comprising:
      receiving video stream from the digital camera;
      identify outline of a face within the video stream;
      translate pixels belonging to the face so that the outline is centered within the digital screen, thereby generating a translated video stream;
      displaying the translated video stream on the digital screen;
      breaking the video stream into makeup sub-sessions according to input from the pre-programmed buttons identifying the timing of start of each of the sub-sessions and inserting marks into the video stream with links to the pre-programmed buttons to thereby generate a marked video stream;
      storing the marked video stream.

2. The digital make-up mirror of claim 1, wherein the controller performs the breaking according to input data entered by a user identifying the timing of start of each of the sub-sessions.

3. The digital make-up mirror of claim 2, wherein the makeup sub-sessions include at least eyes, cheeks, and lips.

4. The digital make-up mirror of claim 1, wherein the controller further performs the step of storing a list of products associated with each makeup sub-sessions.

5. The digital make-up mirror of claim 1, wherein the controller further performs the steps of:
   identifying outlines of face features in the video stream; and,
   tracking location of each identified face feature in each frame.

6. The digital make-up mirror of claim 5, wherein the controller applies virtual reality by modifying attributes of pixels belonging to identified face features.

7. The digital make-up mirror of claim 6, wherein the controller applies virtual reality by further constructing a mask corresponding to the identified face features.

8. The digital make-up mirror of claim 1, wherein the controller further performs the step comprising:
   identify attributes of a make-up within the video stream; and,
   map the attributes to a database of products;
   wherein the attributes include at least one of color, transparency and glossiness.

9. The digital make-up mirror of claim 1, wherein the controller further performs the step comprising:
   identifying a sclera within the frame;
   identifying an iris within the sclera; and,
   translating pixels belonging to the iris so that the iris appears central within the sclera.

10. The digital make-up mirror of claim 1, wherein the controller further performs the step comprising:
    receiving the video stream from the camera;
    identifying facial features within the video stream;
    flipping each frame over a vertical axis to replace right side with left side of the image to thereby mimic a mirror image;
    transforming each frame to emulate an image of the user looking directly at a camera positioned behind the screen;
    cropping each frame to enable display of the face of the user at the center of the digital screen; and,
    displaying the video stream on the digital screen after the flipping, transforming and cropping operations.

11. The digital make-up mirror of claim 10, wherein the controller further performs the operation comprising identifying facial features within each frame of the video stream so as to track location of each of the facial features within each frame.

12. The digital make-up mirror of claim 11, wherein the facial features include one or more of face, lips, eyes, and eyebrow.

13. The digital make-up mirror of claim 12, wherein the facial features further include chin and nose.

14. The digital make-up mirror of claim 10, wherein identifying facial features comprises identifying outlines of facial features.

15. The digital make-up mirror of claim 10, wherein identifying facial features comprises identifying pixels belonging to each facial feature.

16. The digital make-up mirror of claim 10, wherein the controller further performs the operation comprising:
    displaying on the digital screen a color pallet corresponding to a makeup category;
    enabling the user to designate a selection from the color pallet;
    digitally applying the selection to one of the facial features corresponding to the makeup category.

17. The digital make-up mirror of claim 16, wherein digitally applying the selection comprises changing attributes of pixels belonging to the facial feature.

18. The digital make-up mirror of claim 16, wherein displaying the color pallet comprises displaying a plurality of colors and a plurality of color attributes.

19. The digital make-up mirror of claim 10, wherein color attributes include at least transparency, splashes of glossiness, and glossiness.

20. The digital make-up mirror of claim 19, wherein the controller further performs the operation comprising enabling the user to modify the attributes after digitally applying the selection.

21. The digital make-up mirror of claim 16, wherein digitally applying the selection further comprises tracking location of each of the facial features within each frame and applying changing digital application of the selection according to movement of the facial feature within each frame.

22. The digital make-up mirror of claim 16, wherein digitally applying the selection using a mask having a shape of a selected facial feature.

23. The digital make-up mirror of claim 16, further comprising a look-up table associating the color pallet and products data.

24. The digital make-up mirror of claim 16, wherein the controller further performs the operation comprising displaying a product corresponding to the designated selection.

25. The digital make-up mirror of claim 10, wherein the controller further performs the operation comprising:
  displaying on the digital screen a plurality of preprogrammed makeup looks;
  enabling the user to designate a selection from the makeup looks;
  digitally applying the selection to user face projected onto the digital screen.

26. The digital make-up mirror of claim 25, wherein the controller further performs the operation comprising displaying on the screen images of the products used in generating the makeup look.

27. The digital make-up mirror of claim 10, further comprising an illumination device comprising a plurality of light sources of a plurality of temperatures.

28. The digital make-up mirror of claim 27, wherein the controller further performs the operation comprising changing lighting intensity of the plurality of light sources to generate a desired overall light temperature.

29. The digital make-up mirror of claim 27, wherein the controller further performs the operation comprising:
  projecting on the digital screen lighting temperature selection;
  enabling the user to designate a selection from the lighting temperature selection;
  changing lighting intensity of the plurality of light sources according to the user designation.

* * * * *